United States Patent Office 3,071,428
Patented Jan. 1, 1963

3,071,428
PROCESS FOR THE PRODUCTION OF WATER-INSOLUBLE METALLIFEROUS AZO-DYESTUFFS ON THE FIBER
Richard Gross, Frankfurt am Main, and Werner Kirst and Reinhard Mohr, Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 11, 1961, Ser. No. 81,952
Claims priority, application Germany Jan. 13, 1960
3 Claims. (Cl. 8—42)

The present invention relates to the production of metalliferous, water-insoluble azo-dyestuffs on the fiber.

U.S. Patent No. 2,768,053 describes a process for the production of metalliferous water-insoluble azo-dyestuffs on the fiber, wherein the fiber material, dyed with water-insoluble azo-dyestuffs containing groups in o.o'-position to the azo-bridge capable of forming metal complexes, is after-treated in a bath giving an alkaline reaction and containing, besides soap, a salt or hydroxide of copper, nickel or cobalt capable of forming complexes and an aliphatic amino or hydroxycarboxylic acid. In this process there are used especially those dyestuffs which are obtained by coupling diazotized o-hydroxy- or o-methoxy-amines of the benzene series with coupling components of the ice color series, i.e. contain a o.o'-dihydroxy or o-hydroxy-o'-methoxy azo grouping. The dyeings obtained according to this process possess better properties of fastness to light and chlorine than the non-metallized dyeings.

This invention is based on the observation that valuable water-insoluble metalliferous azo-dyestuffs can be produced on the fiber by subjecting the dyeings and printings obtained on the fiber from diazonium compounds of heterocyclic amines containing in the molecule the grouping

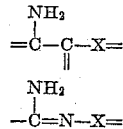

or

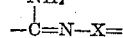

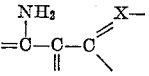

wherein X represents a nitrogen atom, which is a member of a heterocyclic ring, and coupling components which are free from groups imparting solubility in water and couple in a position adjacent to the hydroxy group, to an alkaline after-treatment in the presence of a dispersing agent or a detergent, a compound yielding metal and a compound forming complexes.

As azo-dyestuffs which according to the present invention can be converted into their complex metal compounds there may be used those which contain in the molecule the grouping

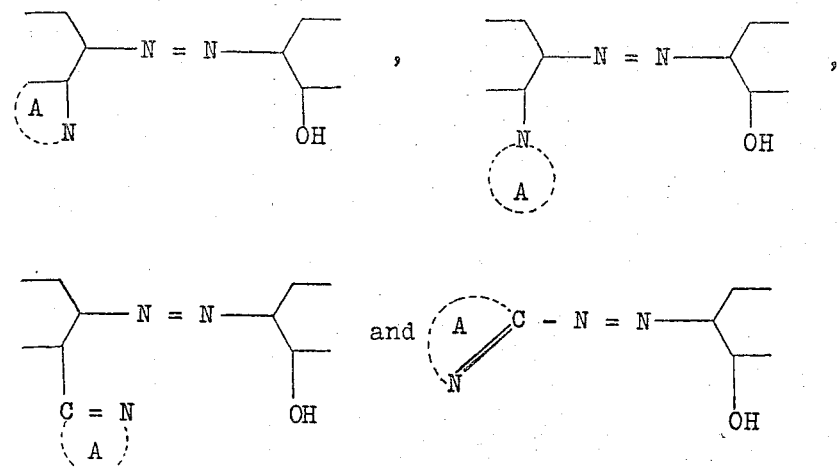

wherein A represents a heterocyclic ring. These dyestuffs are obtained by coupling the diazonium compounds of heterocyclic amines containing in the molecule the groupings I, II or III described above with coupling components containing no groups imparting solubility in water, for example sulfonic acid or carboxylic acid groups, and coupling in a position adjacent to a hydroxy group.

As coupling components there are used compounds coupling in a position adjacent to a hydroxy group, particularly arylamides of aromatic or heterocyclic o-hydroxycarboxylic acids or acylacetic acids and other aromatic or heterocyclic hydroxy compounds and compounds containing an enolizable or enolized ketomethylene group in a heterocyclic ring. Such compounds are, for example, arylamides of 2.3-hydroxy-naphthoic acid or its derivatives substituted in 6-position, arylamides of 2-hydroxy-anthracene-3-carboxylic acid, cresotinic acids, halogen salicylic acids, 4-hydroxydiphenyl-3-carboxylic acid, 2-hydroxycarbazole-3-carboxylic acid, 5-hydroxy-1.2.1'.2'-benzocarbazole-4-carboxylic acid, 3-hydroxy-diphenylene oxide-2-carboxylic acid, 3-hydroxy-diphenylene sulfide-2-carboxylic acid, acetoacetic acid, benzoylacetic acid or terephthaloyl-bis-acetic acid; hydroxy-benzenes substituted in p-position for example, 4-chloro-1-hydroxybenzene, 4-methyl-1-hydroxybenzene, 4-isopropyl-1-hydroxybenzene, 4-tert.-butyl-1-hydroxybenzene, 4-acyl-amino-1-hydroxybenzene or 3-amino-4-methyl-1-hydroxybenzene; polyhydroxybenzenes, for example, 1.3-dihydroxybenzene, 1.3.5-trihydroxybenzene, 2.4-dihydroxybenzophenone or 1.4-di-(2'.4'-dihydroxybenzoyl)-benzene, hydroxynaphthalenes, for example 2-hydroxynaphthalene, 6-bromo-2-hydroxynaphthalene, 6-methoxy-2-hydroxynaphthalene, 7-methoxy-2-hydroxynaphthalene, 1-acylamino-7-hydroxy-naphthalene, 5-chloro-1-hydroxynaphthalene, 4-chloro-1-hydroxynaphthalene, 5.8-dichloro-1-hydroxynaphthalene, 1-acylamino-7-hydroxynaphthalene, 7-benzoylamino-2-hydroxy-naphthalene, 1-hydroxynaphthalene-5-sulfonic acid amide, 1-hydroxy-4-methoxynaphthalene, 1-hydroxy-4-benzoylnaphthalene, 2-hydroxynaphthalene-3-carboxylic acid methyl ester, 2-hydroxynaphthalene-6-carboxylic acid arylamides, 2-hydroxynaphthalene-6-sulfonic acid amides or 2-hydroxynaphthalene-6-alkylsulfones, dihydroxynaphthalenes, for example, 1.3-, 2.6- or 2.7-dihydroxynaphthalene, pyrazolones, for example 1-phenyl-5-pyrazolone-3-carboxylic acid amides, 1-phenyl-3-methyl-5-pyrazolone, 1-(4'-chlorophenyl)-3-methyl-5-pyrazolone, 1-(2'.5'-dichlorophenyl)-3-methyl-pyrazolone or 1-(naphthyl-2')-3-methyl-5-pyrazolone or derivatives of barbituric acid.

As heterocyclic amines containing in the molecule the above groupings I, II and III there may be mentioned, for example, 2-(2'-aminoaryl)-4.5-arylene-1.2.3-triazole, 2-(2'-aminoaryl) - 4.5 - arylene - 1.2.3 - triazole-1-oxide, 8 - aminoquinoline, 7 - aminoindazoles, 3-aminoindazoles, 7-aminobenzimidazoles, 7-aminobenztriazoles, 1-aminocarbazoles, 2-(2'-aminophenyl)-benzimidazoles, 2-(2'-aminophenyl)-benzthiazoles, 1 - (2' - aminoaryl)-1.2.3.4-tetrazoles, 5-(2'-aminoaryl) - 1.2.3.4 - tetrazoles, 2-(2'-aminoaryl) - 1.3.4 - triazoles, 2-(2'-aminoaryl)-1.3.4-oxdiazole, 2-(2'-aminoaryl)-1.3.4-thiodiazoles, 4-aminobenzo-2.1.3-thiodiazoles and 3-amino-1-phenyl-5-imino-4.5-dihydro-1.2.4-triazole.

As fiber material there are used in the process according to the present invention particularly cotton or regenerated cellulose, furthermore wool, silk, acetate rayon, polyamide or polyvinylalcohol fibers.

The after treatment of the dyeings and printings prepared according to known methods may be carried out at an elevated temperature, preferably between about 80° C. and 100° C. in an aqueous bath, preferably in a bath rendered alkaline with soda, in the presence of dispersing agents or detergents for example a fatty alcohol polyglycol ether, an alkylphenol polyglycol ether, an alkylnaphthol polyglycol ether, a fatty acid amide polyglycol ether, a fatty acid polyglycol ester, condensation products from an aminoalkyl or hydroxyalkylsulfonic acid and a fatty acid of high molecular weight or alkylarylsulfonates. Alternatively, the dyeings and printings are first treated in a bath containing a dispersing agent or a detergent, a compound yielding metal, a complex-forming compound and a compound splitting off alkali, for example, the sodium salt of trichloroacetic acid and subsequently steamed. During steaming, alkali is set free and metal complexes are formed.

This method is advantageous where discharge pastes are printed before steaming. In other cases, it is unnecessary to add an agent splitting off alkali and the articles may be treated, before steaming, with a solution giving an alkaline reaction containing a dispersing agent or detergent, a compound forming metal complexes and a compound yielding metal.

As compounds yielding metal there are preferably used the water-soluble salts of copper, nickel or cobalt, for example sulfates, chlorides, bromides, nitrates, acetates, formiates and salts of organic sulfonic acids. Cobalt salts are advantageously used together with an oxidizing agent, for example alkali metal perborates, alkali metal persulfates or alkali metal percarbonates.

As compounds forming complexes which may be used for the process of the present invention there may be mentioned more especially: alkali metal phosphates, such as alkali metal metaphosphates, alkali metal pyrophosphates or alkali metal polyphosphates, alkanolamines such as diethanolamine or triethanolamine, aliphatic dicarboxylic acids such as oxalic acid or maleic acid, aliphatic hydroxycarboxylic acids, for example citric acid, tartaric acid, lactic acid or gluconic acid or aliphatic aminocarboxylic acids such as aminoacetic acid, nitrilotriacetic acid, ethylenediamine tetracetic acid or glutamic acid, the choice of the compounds forming complexes being dependent on the stability of the resulting metal complex compounds to alkali metal.

The process according to the invention is especially advantageous for the preparation of white and colored discharges whereby the white and colored discharges are prepared first in the usual manner and then subjected to the after-treatment according to the invention. By this method purer discharges are obtained than with the usual metallization and subsequent after-treatment with detergents and dispersing agents.

In the process according to the invention wherein the treatment bath contains a compound yielding metal and a compound forming complexes in addition to a dispersing agent or detergent, metal complexes are formed more rapidly and often at lower temperatures than those used in the process described in U.S. Patent No. 2,768,053.

The following examples serve to illustrate the invention but they are not intended to limit it thereto.

*Example 1*

A cotton fabric is continuously dyed on the foulard in the usual manner, while intermediately drying the impregnation, with a solution containing per liter of water 6.08 grams of 1-(2'.3'-hydroxynaphthoylamino) - 2 - methoxybenzene and a diazo solution containing, per liter of water, 5.4 grams of 1-amino-6-chloroindazole. After passing through air for 30 seconds and through a bath at 80° C. containing, per liter of water, 1 gram of disodium phosphate, the material is rinsed and after-treated for 20 minutes at 90° C. to 95° C. at a goods-to-liquor ratio of 1:20 in a bath containing, per liter of water, 1 gram of a reaction product from about 10 mols of ethylene oxide and 1 mol of isododecyl phenol, 3 grams of sodium carbonate, 0.8 gram of cobalt chloride, 1.6 grams of aminoacetic acid and 0.08 gram of sodium perborate. The material is then rinsed and dried. A green dyeing having good properties of fastness is obtained.

In order to produce a white discharge, the material is dried after development with the diazo solution and the cotton fabric is printed with a printing paste containing, per kilogoram, 200 grams of sodium formaldehyde sulfoxylate, 50 grams of the sodium salt of benzylsulfanilic acid 1:1, 30 grams of potassium carbonate, 30 grams of anthraquinone paste of 30% strength, 450 grams of a starch-tragacanth thickening, 100 grams of zinc white 1:1 and 140 grams of water.

The material is then dried, steamed, rinsed at 90° C. with a solution containing, per liter of water, 2.2 grams of caustic soda and with hot water, and then after-treated as described above. A white discharge on green base is obtained.

By using vat dyestuffs in the printing paste, there can likewise be produced color discharges on green base.

By using in this example 0.8 gram of nickel sulfate, instead of 0.8 gram of cobalt chloride, there is obtained a dark violet dyeing or a white discharge on dark violet base.

*Example 2*

A cotton fabric is dyed in the usual manner with a solution containing, per kilogram of goods, 6.3 grams of 1-(2'.3'-hydroxynaphthoylamino)-2.4-dimethoxy-5 - chlorobenzene and 4.48 grams of diazotized 3-amino-6-chlorindazole, and treated with a solution containing, per liter of water, 1.5 grams of a reaction product from about 6 mols of ethylene oxide and 1 mol of isododecyl phenol, 7.8 grams of cobalt chloride, 8.75 grams of the sodium salt of nitrilotriacetic acid in the form of its aqueous solution of 25% strength, and 32 grams of the sodium salt of trichloroacetic acid. The solution is adjusted to a pH of 6.8 by means of 6 grams of trichloroacetic acid.

The cotton fabric is then dried and printed with a printing paste containing, per kilogram, 200 grams of sodium formaldehyde sulfoxylate, 100 grams of zinc white 1:1, 50 grams of the sodium salt of benzylsulfanilic acid, 30 grams of potassium carbonate, 30 grams of anthraquinone paste of 30% strength, 450 grams of a starch-tragacanth thickening and 140 grams of water.

The fabric is then dried, steamed for 7 minutes at about 102° C., rinsed first at 90° C. with a solution containing, per liter of water, 2.2 grams of caustic soda, and then several times in the hot and in the cold, soaped with a solution containing, per liter of water, 1 gram of a reaction product from about 6 mols of ethylene oxide and 1 mol of isododecyl phenol, 3 grams of sodium carbonate and 0.5 gram of the sodium salt of nitrilotriacetic acid, rinsed and dried.

A green dyeing with white discharge effects is obtained.

Example 3

A cotton fabric is dyed in the usual manner with a solution containing, per kilogram of goods, 6.45 grams of 1-(6'-methoxy-2'.3'-hydroxynaphthoylamino)-2 - methoxybenzene and 4.48 grams of diazotized 3-amino-6-chloroindazole and treated with a solution containing, per liter of water, 8.3 grams of copper sulfate, 9 grams of the sodium salt of nitrilotriacetic acid, 32.5 grams of the sodium salt of trichloroacetic acid and 1.5 grams of a reaction product from about 6 mols of ethylene oxide and 1 mol of isododecyl phenol, this solution being neutralized with 6 grams of trichloroacetic acid.

The material is then dried, steamed for 10 minutes at about 102° C., soaped at the boil, rinsed and dried. A blue grey dyeing is obtained.

Example 4

A cotton fabric is dyed in the usual manner with a solution containing, per kilogram of goods, 7.5 grams of 1-(2'.3'-hydroxynaphthoylamino)-2.4-dimethoxy-5 - chlorobenzene and 4.1 grams of diazotized 3-amino-6-chloroindazole and slop-padded with a cold solution containing, per liter of water, 7.2 grams of cobalt chloride, 19.4 grams of aminoacetic acid, 50 grams of urea and 17 cc. of sodium hydroxide solution of 38° Bé. and having a pH of 9.6.

The material is then dried and steamed for 7 minutes at 102° C. It is then rinsed, soaped at the boil and dried.

A green dyeing is obtained.

Example 5

A cotton fabric dyed with the azo-dyestuff mentioned in Example 4 is slop-padded with a cold solution containing, per liter of water, 7.5 grams of copper sulfate, 22.5 grams of triethanolamine and 50 grams of urea and having a pH of 8.6.

The material is dried and steamed for 7 to 10 minutes at 102° C., rinsed and soaped at the boil.

A blue-grey dyeing is obtained.

Instead of 22.5 grams of triethanolamine, there may also be used in the present example 38 grams of an alkaline solution of 25% strength of the sodium salt of nitrilotriacetic acid having a pH of 11.5.

In the following table are given further components which can be used in the process of this invention and also the tints of the azo-dyestuffs containing metal produced from these components on the fiber.

| Diazo component | Coupling component | Dispersing agent | Metal-yielding compound | Complex-forming compound | Tint |
|---|---|---|---|---|---|
| 2-(2'-amino-4'-methoxy-5'-methylphenyl)-benztriazole-1-oxide. | 2,3-hydroxy-naphthoyl-aminobenzene. | Reaction product from 10 mols ethylene oxide and 1 mol nonyl phenol. | Copper sulfate. | Triethanolamine. | Dark brown. |
| 3-amino-5-chloroindazole. | 1-(2'.3'-hydroxynaphthoylamino)-4-chlorobenzene. | ----do---- | ----do---- | ----do---- | Dark blue. |
| 3-amino-6-chloroindazole. | 1-(2'-hydroxyanthracene-3'-carboylamino)-2-methylbenzene. | ----do---- | ----do---- | ----do---- | Green. |
| Do. | ----do---- | ----do---- | Cobalt chloride. | Nitrilotriacetic acid. | Do. |
| Do. | 1-(2'.3'-hydroxynaphthoylamino)-2-methoxybenzene. | ----do---- | ----do---- | Sodium polyphosphate. | Do. |
| Do. | 1-(2'-hydroxycarbazole-3'-carboylamino)-4-chlorobenzene. | ----do---- | ----do---- | Sodium pyrophosphate. | Grey. |
| Do. | 1-(2'.3'-hydroxynaphthoylamino)-2-ethoxybenzene. | ----do---- | ----do---- | Citric acid. | Green. |
| Do. | 1-(2'.3'-hydroxynaphthoylamino)-2-methoxybenzene. | ----do---- | Copper sulfate. | Oxalic acid. | Blue grey. |
| Do. | 1-(2'.3'-hydroxynaphthoylamino)-2-methylbenzene. | ----do---- | ----do---- | Aminoacetic acid. | Do. |
| Do. | ----do---- | ----do---- | Cobalt chloride. | Gluconic acid. | Do. |
| Do. | 1-(2'.3'-hydroxynaphthoylamino)-2.4-dimethoxy-5-chlorobenzene. | Reaction product from 6 mols ethylene oxide and 1 mol nonyl phenol. | Copper sulfate. | Sodium pyrophosphate. | Do. |
| 3-amino-1-methyl-6-chloroindazole. | 1-(6'-methoxy-2'.3'-hydroxynaphthoylamino)-2-methoxybenzene. | ----do---- | Nickel sulfate. | Aminoacetic acid. | Dark blue. |
| 3-amino-1-methyl-5-nitroindazole. | 2-(2'.3'-hydroxynaphthoylamino)-naphthalene. | ----do---- | ----do---- | ----do---- | Do. |
| 1-aminocarbazole. | 1-(2'.3'-hydroxynaphthoylamino),2,4-dimethoxy-5-chlorobenzene. | ----do---- | Cobalt chloride. | ----do---- | Black. |
| Do. | ----do---- | ----do---- | Copper sulfate. | Triethanolamine. | Blue black. |
| 7-amino-2.5-dimethylbenzimidazole. | 1-(2'.3'-hydroxynaphthoylamino)-2-methyl-4-chlorobenzene. | ----do---- | Nickel sulfate. | Aminoacetic acid. | Claret. |
| 7-amino-5-methylbenztriazole. | 2-(2'.3'-hydroxynaphthoylamino)-3-methoxydiphenylene oxide. | ----do---- | Copper sulfate. | Triethanolamine. | Currant. |
| 8-aminoquinoline. | 2,3-hydroxynaphthoyl-aminobenzene. | ----do---- | ----do---- | ----do---- | Claret. |
| Do. | ----do---- | Reaction product from 20 mols ethylene oxide and 1 mol octadecyl alcohol. | Cobalt chloride. | Aminoacetic acid. | Garnet. |
| Do. | ----do---- | Reaction product from 20 mols ethylene oxide and 1 mol oleyl alcohol. | Nickel sulfate. | ----do---- | Claret. |
| 2-(2'-amino-4'-methoxy-5'-methylphenyl)-benztriazole-1-oxide. | 2-(2'.3'-hydroxynaphthoylamino)-naphthalene. | Reaction product from 10 mols ethylene oxide and 1 mol nonyl phenol. | Copper sulfate. | Tartaric acid. | Dark brown. |
| 2-(2'-amino-4'.5'-diethoxyphenyl)-6-methoxybenztriazole-1-oxide. | 1-(2'.3'-hydroxynaphthoylamino)-4-chlorobenzene. | ----do---- | Copper nitrate. | Diethanolamine. | Do. |
| Do. | 1-(2'.3'-hydroxynaphthoylamino)-3-nitrobenzene. | Reaction product from 6 mols ethylene oxide and 1 mol nonyl phenol. | Copper acetate. | Triethanolamine. | Do. |

| Diazo component | Coupling component | Dispersing agent | Metal-yielding compound | Complex-forming compound | Tint |
|---|---|---|---|---|---|
| 2-(2'-amino-4',5'-diethoxyphenyl)-6-methoxybenztriazole. | 2-(2',3'-hydroxynaphthoylamino)-naphthalene. | Reaction product from 6 mols etylene oxide and 1 mol nonyl phenol. | Copper acetate.. | Triethanolamine......... | Dark brown. |
| 1-methyl-5-(2'-amino-5'-chlorophenyl)-1,2,3,4-tetrazole. | 1-(2',3'-hydroxynaphthoylamino)-2-methoxybenzene. | Reaction product from 20 mols ethylene oxide and 1 mol oleyl alcohol. | Cobalt sulfate.. | Nitrilotriacetic acid..... | Yellow brown. |
| Do.................. | 1-(2',3'-hydroxynaphthoylamino)-2-methyl-4-methoxybenzene. | Reaction product from 10 mols ethylene oxide and 1 mol nonyl phenol. | Nickel sulfate... | Aminoacetic acid......... | Red brown. |
| 2-(2'-amino-4'-chlorophenyl)-1,5-diphenyl-1,3,4-triazole. | 2,3-hydroxynaphthoylaminobenzene. | Reaction product from 12 mols ethylene oxide and 1 mol dodecyl phenol. | .....do......... | .....do............... | Garnet. |
| 2-(2'-amino-5'-chlorophenyl)-5-phenyl-1,3,4-oxdiazole. | 1-(2',3'-hydroxynaphthoylamino)-2,4-dimethoxy-5-chlorobenzene. | Reaction product from 40 mols ethylene oxide and 1 mol castor oil. | Cobalt chloride. | Nitrilotriacetic acid..... | Red brown. |
| 2-(2'-aminophenyl)-1,5-dimethylbenzimidazole. | 1-(2',3'-hydroxynaphthoylamino)-2,5-dimethoxy-4-chlorobenzene. | Reaction product from 6 mols ethylene oxide and 1 mol isododecyl phenol. | Copper sulfate.. | Triethanolamine......... | Brown. |
| Do.................. | 1-(2',3'-hydroxynaphthoylamino)-2,4-dimethoxy-5-chlorobenzene. | Reaction product from 9 mols ethylene oxide and 1 mol hexyl-heptyl-β-naphthol. | Nickel sulfate... | Aminoacetic acid......... | Garnet. |
| 2-(2'-aminophenyl)-5-chlorobenzthiazole. | 1-(2',3'-hydroxynaphthoylamino)-2-methyl-4-methoxybenzene. | Reaction product from 10 mols ethylene oxide and 1 mol nonyl phenol. | Copper sulfate.. | Triethanolamine......... | Rust red. |

We claim:
1. An alkaline composition suitable for the after-treatment of vegetable fibres which have been dyed with a water-insoluble azo-dyestuff having a grouping selected from the group consisting of

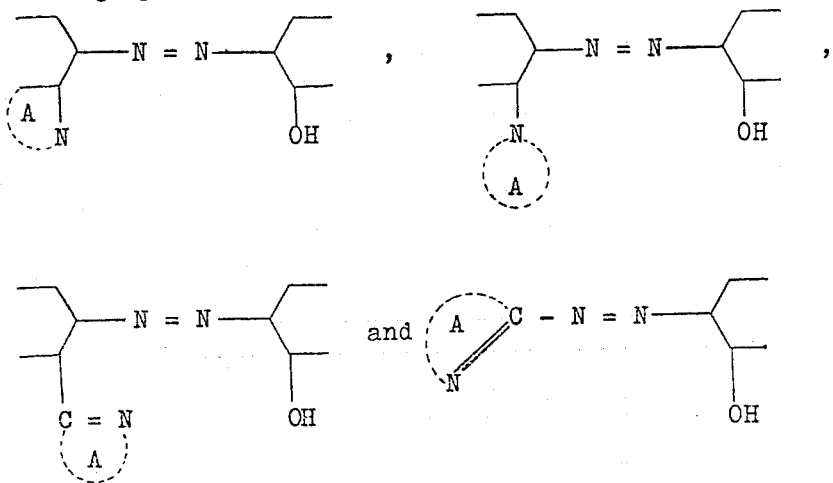

wherein A represents a heterocyclic ring having from 5 to 6 ring atoms, consisting essentially of (a) a non-ionic dispersing agent selected from the group consisting of fatty alcohol polyglycol ethers, alkyl phenol polyglycol ethers, alkyl naphthol polyglycol ethers, fatty acid polyglycol esters and fatty acid amide polyglycol ethers, (b) a metal yielding agent selected from the group consisting of the copper, cobalt and nickel salts of the inorganic and low aliphatic carboxylic acids, and (c) a metal complex forming compound selected from the group consisting of alkali metal phosphates, hydroxyalkylamines, aliphatic dicarboxylic acids, aliphatic hydroxycarboxylic acids and aliphatic amino carboxylic acids.

2. The process for the production of complex metal compounds having a metal selected from the group consisting of copper, cobalt and nickel, of a water-insoluble azo-dyestuff having a grouping selected from the group consisting of

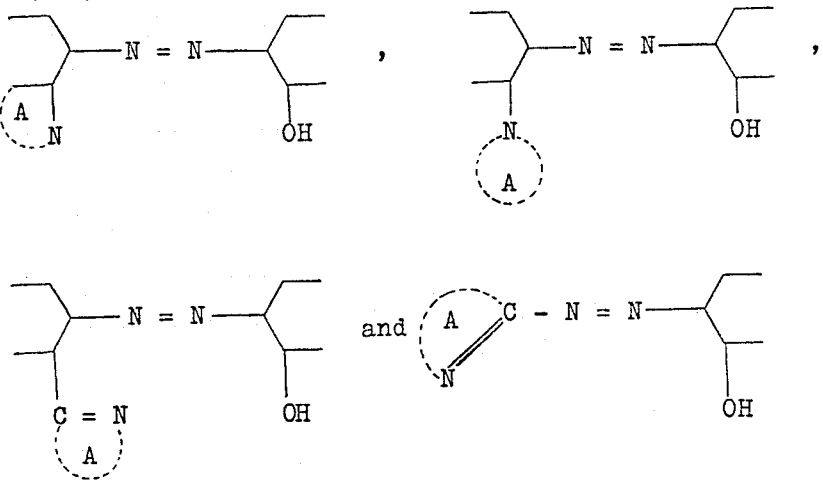

wherein A represents a heterocyclic ring having from 5 to 6 ring atoms, on vegetable fibres, which comprises after-treating vegetable fibres, which have been dyed with a water-insoluble azo-dyestuff having one of said four groupings, with an alkaline composition consisting of (a) a non-ionic dispersing agent selected from the group consisting of fatty alcohol polyglycol ethers, alkyl phenol polyglycol ethers, alkyl naphthol polyglycol ethers, fatty acid polyglycol esters and fatty acid amide polyglycol ethers, (b) a metal yielding agent selected from the group consisting of the copper, cobalt and nickel salts of the inorganic and low aliphatic carboxylic acids, and (c) a metal complex forming compound selected from the group consisting of alkali metal phosphates, hydroxyalkylamines, aliphatic dicarboxylic acids, aliphatic hydroxycarboxylic acids and aliphatic amino carboxylic acids.

3. The process of claim 2, wherein the treatment of the colored vegetable fibres with said alkaline composition is carried out at a temperature in the range of about 80° C. to 100° C.

References Cited in the file of this patent

UNITED STATES PATENTS

| | | |
|---|---|---|
| 2,768,053 | Streck | Oct. 23, 1956 |
| 2,893,814 | Streck | July 7, 1959 |